United States Patent
Schmitt

[15] 3,702,087
[45] Nov. 7, 1972

[54] DOUBLE SHANK BOLT

[72] Inventor: Hubert A. Schmitt, Auburn, Wash.

[73] Assignee: The Boeing Company, Seattle, Wash.

[22] Filed: March 31, 1971

[21] Appl. No.: 129,773

[52] U.S. Cl. ........................................ 85/39, 85/4
[51] Int. Cl. ............................................ F16b 19/10
[58] Field of Search .......... 85/37, 39, 77, 78, 72, 70, 85/82, 83, 4; 151/31

[56] References Cited

UNITED STATES PATENTS

| | | | |
|---|---|---|---|
| 2,154,012 | 4/1939 | Rhodes | 85/39 |
| 2,325,608 | 8/1943 | Hofstetter | 151/31 |
| 2,348,589 | 5/1944 | Auten | 85/82 |
| 2,384,321 | 9/1945 | Lees | 85/78 |
| 3,007,364 | 11/1961 | Dickie | 85/74 |
| 3,065,661 | 11/1962 | Kolec et al. | 85/72 |
| 3,198,058 | 8/1965 | Barry | 85/84 |
| 3,271,058 | 9/1966 | Anderson | 85/4 |
| 3,369,442 | 2/1968 | Darby et al. | 85/70 |
| 3,453,927 | 7/1969 | Moore | 85/72 |
| 3,461,772 | 8/1969 | Barry | 85/83 |

FOREIGN PATENTS OR APPLICATIONS

| | | | |
|---|---|---|---|
| 916,048 | 1/1963 | Great Britain | 85/21 |
| 640,865 | 5/1962 | Canada | 84/39 |
| 43,173 | 11/1933 | France | 85/77 |
| 1,285,260 | 12/1968 | Germany | 85/82 |

*Primary Examiner*—Marion Parsons, Jr.
*Attorney*—Glenn Orlob, Kenneth W. Thomas and Bernard A. Donahue

[57] ABSTRACT

A high strength bolt type fastening system comprising an external member and an internal member which lockingly interengage within a hole passing through an overlapping pair of structural members upon application of longitudinal driving forces by standard riveting equipment. The external member is provided with a smooth conical recess having a taper of approximately .020 inch per inch to receive a matching solid conical stud portion of the internal member which has a serrated surface of correspondingly larger diameters than the recess to expand the external member and the hole and cause the serrations to lockingly engage the smooth wall of the recess to secure the joint.

1 Claim, 5 Drawing Figures

PATENTED NOV 7 1972
3,702,087
Fig. 1
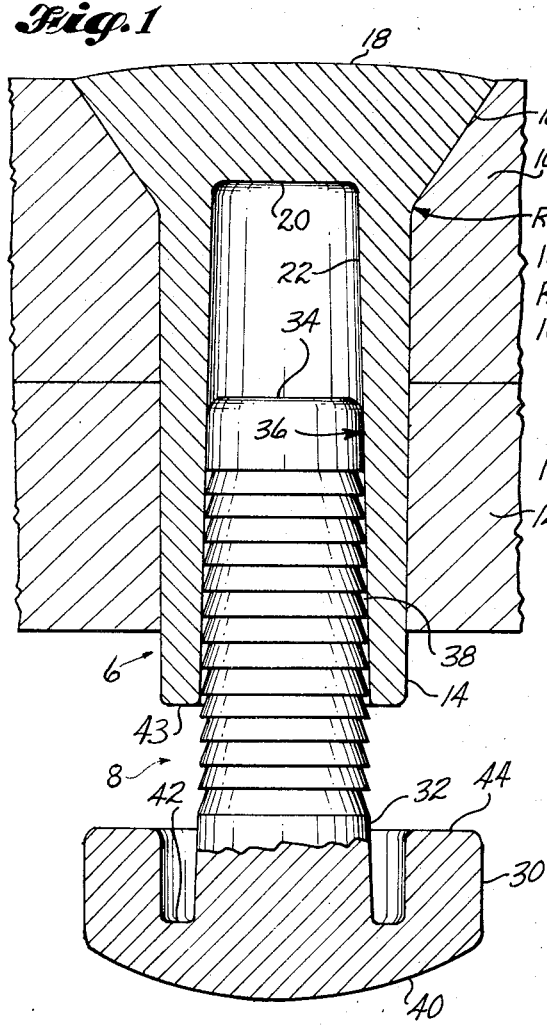
Fig. 2
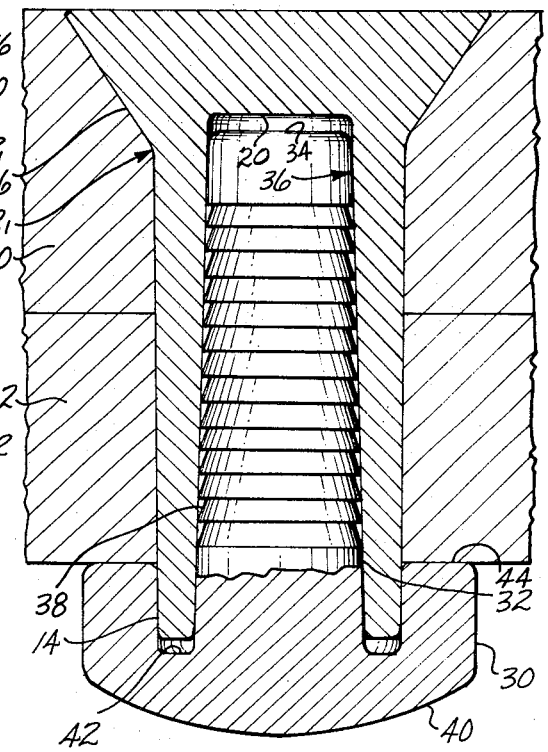
Fig. 4
Fig. 5
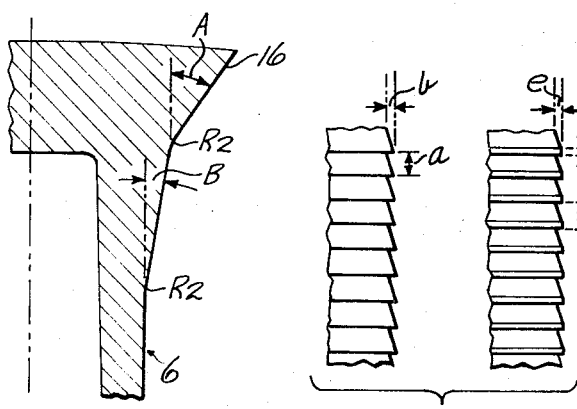
Fig. 3
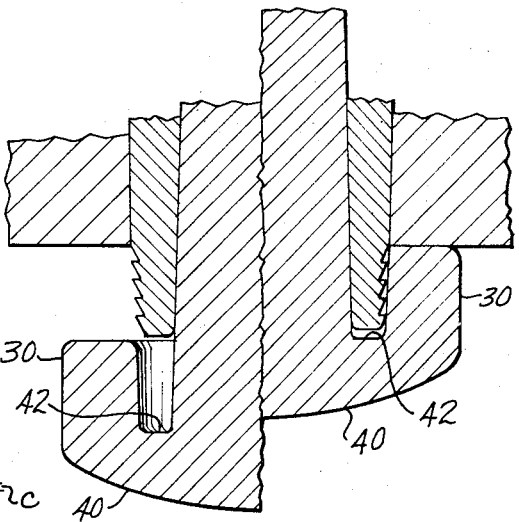
INVENTOR,
HUBERT A. SCHMITT
BY
Bernard A Donahue
ATTORNEY

DOUBLE SHANK BOLT

BACKGROUND OF THE INVENTION

1. Field of The Invention

This invention relates to a double shank bolt type fastener for aircraft structures which may be economically installed in the manner of a rivet, but which develops shear and tensile strength properties approaching those of a conventional aircraft bolt. The fastener is radially expanding under the action of matched conical surfaces to create an interference fit preload of the material surrounding the hole for improved fatigue life.

2. Description of The Prior Art

In aircraft structural applications requiring high strength fasteners and long fatigue life under fluctuating loads it is customary to use threaded bolts with high strength threaded nuts. Such bolt and nut combinations must be carefully installed and torqued to predetermined values with a resulting high cost per installation. A recent practice has been to install tapered bolts in interference fit holes, in order to obtain a prestressed condition around the hole for increased fatigue life. Interference fit installations are notoriously expensive in terms of total cost per joint.

Two-piece expandable sleeve fastener assemblies utilizing draw pins passing completely through the sleeve, such as those shown in U.S. Pat. No. 3,271,058 to Anderson, can be used to obtain some degree of preload around the hole, but as is pointed out in the Anderson patent, these sleeve assemblies normally require a threaded bolt-to-nut connection or other external holding means because of their tendency to loosen under vibration loadings. Accordingly, the installed cost for such expandable sleeve fastener assemblies remains high and their reliability low for aircraft applications.

It is a primary object of this invention to provide a fastener system for use in aircraft structural applications, which may be quickly and economically installed in the manner of a rivet but which has strength characteristics approaching those of a conventional bolt, and which will radially expand to prestress the material surrounding the hole for increased fatigue life.

A related objective is to provide a flush-head fastener of the class described which has an adjustable grip length by virtue of the engagement of a serrated conical stud with a smooth conical surface on mated parts of the fastener assembly.

SUMMARY

The basic objectives of this invention have been achieved by a two-part radially expanding double shank fastener assembly comprising external and internal members which lockingly interengage at an interface between a serrated conical stud portion of the internal member and a matching smooth conical wall of a recess in one end of the external member. The external member is expanded outwardly by the internal member into a prestressed condition wherein the serration notches will retain the members locked in their respective positions upon installation. When installed in a close tolerance hole, the assembly will radially expand to create a predetermined residual hoop tension stress in the material surrounding the hole to thereby enhance the fatigue life characteristics of the joint.

BRIEF DESCRIPTION OF THE DRAWINGS

FIG. 1 depicts a bolt assembly of the present invention wherein the internal member is initially placed in touching relationship within the external member prior to the application of driving force.

FIG. 2 shows the bolt assembly of FIG. 1 wherein the internal member has been driven to its final installed position by the application of driving forces to opposite ends of the fastener assembly.

FIG. 3 is a split cross-sectional view of an optional feature of the present invention wherein the outer portion of the external member is provided with serrations to lockingly engage the head of the internal member; shown both prior to, and after final installation.

FIG. 4 shows an optional double tapered head configuration suitable for use on the FIG. 1 external member.

FIG. 5 shows detailed geometry of two optional serration notch configurations which are suitable for use with the bolt of this invention.

DESCRIPTION OF THE PREFERRED EMBODIMENTS

FIG. 1 is a cross-sectional view showing a bolt assembly of this invention wherein an external member 6 and an internal member 8 are positioned ready for installation in an aligned concentric hole passing through structural members 10 and 12. External member 6 comprises a cylindrical shank portion 14 interconnected by a surface $R_1$ to a solid flush head end portion 16 having a countersink cone angle of 70°, and a convex end surface 18 with a sufficient curvature to redistribute driving forces applied by conventional riveting tools. The radius of curvature of surface $R_1$ is preferably greater than .03 inches. Shank portion 14 is provided with a tapered recess having a bottom wall 20 and a smooth inner wall 22 which is preferably tapered at .020 inch per inch along its entire length.

The internal member 8 is shown in FIG. 1 to be in a nesting or touching engagement with external member 6, prior to the application of driving forces to complete the installation of the fastener in the joint. Internal member 8 comprises a head-end portion 30 integrally connected to a conically shaped stud-end portion 32 tapered to match the taper of the inner wall 22 of the external member 6. Stud-end portion 32 includes a smooth and rounded end surface 34, a smooth longitudinally extending conical lead-in surface 36, and a serrated section 38 having a plurality of serration notches of a type to be described for engagement with the smooth inner wall of the recess in external member 6. Head-end portion 30 includes a domed end surface 40 of constant convex curvature for distribution of driving forces, an annular recess 42 sized to nestingly receive the open end portion 43 of shank portion 14, and a laterally extending end surface 44 for limiting the travel of the internal member upon installation.

With the parts positioned as shown in FIG. 1 in touching contact, it will be noted that the total length of travel of internal member 8 required to finish installation of the fastener assembly is very short; being somewhat less than the exterior diameter of the fastener. The fastener assembly was developed by the inventor to minimize this travel length during application of driving forces to eliminate difficulties encountered with certain prior art two-piece expanding sleeve systems which require much longer relative movement of an inner draw-pin member with respect to the sleeve. Such long distance movement under installation forces tends to create bending, sleeve stretching, and galling problems. Using the preferred .020 inch per inch taper discussed earlier, a total travel of ¼ inch from the touching position of FIG. 1 to the fully installed position of FIG. 2 will result in the creation of approximately .005 inches of diametrical interference between the internal and external members and substantially the same degree of interference preload of the structure surrounding the hole. In the development of this invention it was found that the one-way locking serrations on stud portion 32 acting against a smooth inner wall of the recess will allow the assembly to be installed with low-level driving forces, and serve to interlock and hold the assembly under tension loads up to and exceeding those associated with threaded shear nut and bolt combinations. The longitudinally extending lead-in surface 36 preferably extends for a length approximating three of the serration notches and provides a smooth but short and relatively low friction contact surface for expanding the outer portions of the recess.

FIG. 2 is a showing of a completed installation, after application of driving forces by riveting equipment to opposite end surfaces 18 and 40 of the fastener assembly. The shallow convex end surface 18 has been essentially flattened under the driving loads to become flush with structural member 10, and the laterally extending surface 44 of internal member 8 is in engaging contact with structural member 12 to thereby limit further travel of the internal member 8 into external member 6. The end portion 43 of shank 14 has been forced into the annular recess 42 in the head portion 30 of internal member 8, with clearance at the bottom of the recess 42 to allow for tolerances in the stack-up thicknesses of the structural members. Likewise, the end surface 34 of stud portion 32 can be seen to have clearance near the bottom wall 20 of the recess in shank portion 14 of the internal member. When fully installed as shown in FIG. 2, a desired degree of radial expansion, such as the .005 inches discussed earlier, will have been achieved and the material surrounding the hole will be prestressed with tensile hoop-tension loads for increasing the effective fatigue life of the joint.

FIG. 3 is a split cross-sectional view showing an optional expedient for increasing the locking or holding strength of the fastener under tensile loads wherein serration notches are provided on the exterior surface of shank portion 14 of the external member, and a matching smooth outer radial surface of recess 42 is disposed to be forced into engaging contact with the serration notches upon installation of the fastener.

FIG. 4 depicts an optional flush head configuration for the external member 6 wherein the head has an outer cone half angle "A" of approximately 70°/2, as in the FIG. 1 configuration, but wherein the cylindrical exterior shank is connected to the head by a second conical surface having a cone half angle "B" which is less than "A" by at least 10°. The radii $R_2$ are somewhat enlarged over the usual minimum fillet radii and should be at least .030 inches and preferably .050 inches minimum. In some interference fit installations this optional head configuration will result in a better distribution of the hoop-tension preload established around the hole for fatigue-life improvement.

FIG. 5 defines the detailed geometry of the sharp edge serration notches shown in FIGS. 1–3, and also an optional configuration utilizing flat surface serration notches. The sharp edge notches shown on the left preferably have a spacing "a" of .030 inches with a depth "b" of from .005 to .010 inches. The flat serrations shown on the right preferably have a flat surface dimension "c" extending between each notch of approximately .010 inches, a pitch dimension "d" of .040 inches, and a depth ranging from .005 to .010 inches. It is preferred to use as many notches as possible, although configurations with as few as six notches will give satisfactory results in some cases. Serration surfaces constructed according to either optional configuration and acting against the smooth conical recess in the manner shown previously will give the desired results; viz., a low friction low driving force expansion of the external member together with a one-way locking engagement which will secure the joint under vibration and tensile loads normally requiring a threaded nut and bolt combination. Test data have shown that the serration to smooth surface interfaces constructed according to this disclosure will hold under tensile loads exceeding the requirements established for threaded shear nuts and bolts of comparable diameter.

Therefore, the disclosed fastener system represents an advance in the aircraft fastener art in that the fastener may be quickly and economically installed in the manner of a rivet while obtaining strength properties approaching those of a bolt. Also, the fastener may be tailored to radially expand a predetermined amount, preferably within a range of approximately .001 to .006 inches, to give a desired prestressing of the material surrounding the hole for fatigue life improvement.

The invention has been described and illustrated in detail using preferred dimensioning and embodiments developed to date. Variations and modifications will occur to persons skilled in this art without departing from the spirit and scope of the invention. Accordingly, it is intended in the appended claims to cover all such variations and modifications.

What is claimed and desired to be secured by U.S. Letters Patent is:

1. A fastener system comprising in combination: an external member and an internal member arranged to lockingly interengage within an aligned concentric hole passing through an overlapping pair of structural members; wherein said external member is provided with a cone shaped solid head-end portion having an included cone angle of approximately 70° adapted to seat in a corresponding countersink of said hole to provide a flush installation on one side of the structural joint; said head-end portion having a convex end surface with a sufficient curvature to redistribute driving forces applied by conventional driving tools; said head-end portion being integrally connected to a shank portion having an essentially cylindrical exterior surface by a radiused surface having a radius of curvature greater than approximately .030 inches; said shank portion having an interior recess defined by a longitudinally aligned concentric conical smooth inner wall which tapers uniformly from a maximum diameter at one end of said external member to a minimum diameter near an interior bottom wall of said recess; wherein said internal member is provided with a head-end portion integrally connected to a conically shaped stud-end portion tapered to match the taper of the inner wall of said recess, said stud-end portion including a lead-in section having a smooth conical surface and a serrated section having at least six closely-spaced notches for engagement with the smooth inner wall of the recess of said external member, the diameters of said stud-end portion being greater than the corresponding diameters of said recess by an amount such that when the fastener system is fully installed within said hole, said internal member will force said external member to expand radially outwardly to a prestressed condition and said serrated section lockingly engages the smooth inner wall of said shank portion to prevent disassembly of said fastener system; wherein the head-end portion of each of said members is provided with laterally extending surfaces for engagement with laterally extending surfaces of said pair of structural members to establish a limit for the interferring engagement of said stud with said inner wall of said shank portion; and wherein when said fastener system is fully installed in said hole, the exterior shape of said external member has been diametrically expanded to cause an interference fit with the walls of said hole ranging from .001 inches to .006 inches to generate hoop tension stresses in the surrounding material for the purpose of increasing the effective fatigue life of the joint.

* * * * *